(12) United States Patent
Rice et al.

(10) Patent No.: US 8,195,541 B2
(45) Date of Patent: Jun. 5, 2012

(54) METHOD OF MARKETING AND CONTRACTING FOR THE SALE OF AGRICULTURAL YIELD-INCREASE RELATED PRODUCTS

(75) Inventors: Richard L. Rice, Collierville, TN (US); Michael Bradley Cloutier, Germantown, TN (US)

(73) Assignee: Plant Health Care, Inc., Pittsburgh, PA (US)

( * ) Notice: Subject to any disclaimer, the term of this patent is extended or adjusted under 35 U.S.C. 154(b) by 19 days.

(21) Appl. No.: 12/608,659

(22) Filed: Oct. 29, 2009

(65) Prior Publication Data

US 2010/0106632 A1    Apr. 29, 2010

Related U.S. Application Data

(60) Provisional application No. 61/109,359, filed on Oct. 29, 2008.

(51) Int. Cl.
*G07F 19/00* (2012.01)
(52) U.S. Cl. ............... 705/34; 705/38; 700/237
(58) Field of Classification Search ............... 705/4, 34
See application file for complete search history.

(56) References Cited

U.S. PATENT DOCUMENTS

| | | | |
|---|---|---|---|
| 5,991,687 A * | 11/1999 | Hale et al. | 701/207 |
| 6,192,664 B1 * | 2/2001 | Missotten et al. | 56/10.2 R |
| 6,522,948 B1 * | 2/2003 | Benneweis | 700/243 |
| 6,865,582 B2 * | 3/2005 | Obradovic et al. | 1/1 |
| 2002/0023052 A1 * | 2/2002 | Remley et al. | 705/38 |
| 2002/0099471 A1 * | 7/2002 | Benneweis | 700/237 |
| 2005/0125260 A1 * | 6/2005 | Green et al. | 705/4 |
| 2006/0015253 A1 * | 1/2006 | Ochs et al. | 702/1 |

OTHER PUBLICATIONS

Griffin, Terry W., "Decision-Making From On-Farm Experiments: Spatial Analysis of Precision Agriculture Data", A dissertation Submitted to the Faculty of Purdue University, Dec. 2006, pp. 1-294.

* cited by examiner

*Primary Examiner* — Scott Zare
*Assistant Examiner* — Talia Crawley
(74) *Attorney, Agent, or Firm* — Robert Plotkin, P.C.

(57) ABSTRACT

A method of contracting for the sale of a yield-increase and/or crop protection related products includes the steps of mapping, using geo-referencing technology, areas of a field which have been treated with the yield-increase and/or crop protection related product and areas of the field which have not been treated, measuring, using geo-referencing technology, an amount of harvested crop from the field in both the treated and untreated areas, comparing the amount of harvested crop in the treated areas with the amount of harvested crop in the untreated areas to determine a yield increase associated with the treated areas, and charging for application of the yield-increase and/or crop protection related product based on the determined amount of yield increase. The data acquired may be stored in a database for further use and comparison.

40 Claims, No Drawings

METHOD OF MARKETING AND CONTRACTING FOR THE SALE OF AGRICULTURAL YIELD-INCREASE RELATED PRODUCTS

CROSS-REFERENCE TO RELATED APPLICATIONS

This application claims the benefit of co-pending Provisional Patent Application Ser. No. 61/109,359 entitled "Method of Marketing and Contracting for the Sale of Agricultural Yield-Increase Related Products", filed on Oct. 29, 2008, the entire disclosure of which is incorporated by reference herein.

FIELD OF THE INVENTION

The present invention relates generally to farming and to a method for marketing and selling yield-increase and/or crop protection products (whether applied pre- or post emergence of the crop or weeds by ground or air, as a treatment applied to crop seed prior to planting, as any type of in-furrow application, or if applied through an irrigation system), and has particular utility in the marketing and selling of yield-increase and/or crop protection products which may not produce a visually discernable difference in the field.

BACKGROUND OF THE INVENTION

In the sale of yield-increase and/or crop protection products, the main problem is selling the farmer/grower on the idea that the product will actually work as it is advertised. While many products are sold with a "satisfaction guaranteed" promise, the farmer is often skeptical of the willingness or the ability of the seller to stand behind its "satisfaction guaranteed" claim. Additionally, while a product may be sold with a promise of, for example, fewer nematodes and higher yields, again, the farmer is often skeptical of such promises.

An additional obstacle arises when the yield-increase and/or crop protection product produces no visually discernable difference in the field. The main question the farmer typically has is will the product work consistently enough to get a positive return on their investment and, if so, how will the farmer know. While a farmer can harvest a field of untreated crop and determine its yield by weighing, and then harvest a field of treated crop and determine its yield also by weighing, and then compare the untreated and treated yields, this is a time consuming and burdensome task. It may not be worth it to the farmer to go through the extra time and expense to separately weigh/measure the yields and make comparisons. Also, if the farmer is under time constraints to get the crop harvested quickly due to weather or other concerns, there may just not be enough time to separately measure and weigh the yields in treated and untreated areas and make any determination or comparison. Further, differences in soils between various fields may also skew the results and not accurately identify the value of the product.

The present invention is directed toward overcoming one or more of the above-mentioned problems.

SUMMARY OF THE INVENTION

A method of contracting for the sale of a yield-increase and/or crop protection related product is provided. The method includes the steps of mapping areas of a field which have been treated with the yield-increase and/or crop protection related product and areas of the field which have not been treated, measuring an amount of harvested crop from the field in both the treated and untreated areas, comparing the amount of harvested crop in the treated areas with the amount of harvested crop in the untreated areas to determine a yield increase associated with the treated areas, and charging for application of the yield-increase related product based on the determined amount of yield increase. The steps of mapping the field with treated and untreated areas and measuring an amount of harvested crop in the treated and untreated areas are done utilizing geo-referencing technology provided on the planting and harvesting equipment. The data acquired may be stored in a database for further use and comparison.

In one form, if application of the yield-increase and/or crop protection does not result in a yield increase, the farmer/grower is not charged.

In a further form, the amount charged for application of the yield-increase and/or crop protection related product increases as the determined amount of yield increase increases. The amount charged for application of the yield-increase and/or crop protection related product may or may not be capped at a maximum amount.

In yet a further form, the geo-referencing technology includes GPS satellites. The yield-increase and/or crop protection product may be applied pre- or post emergence of the crop or weeds by ground or air.

It is an object of the present invention to allow farmers to measure harvested crops from treated and untreated areas without slowing down the harvesting process.

It is a further object of the present invention to eliminate the need to harvest varieties/hybrids separately.

It is yet a further object of the present invention to eliminate the need for mechanical weigh wagons or scales (except for yield monitor calibration).

It is still a further object of the present invention to compensate for field variability (soil type, elevation, etc.) while delivering statistically significant data from on-farm field demonstrations of any size.

It is another object of the present invention to instill a sense of confidence in the farmer that the yield-increase and/or crop protection product applied is actually producing a yield increase and that the farmer is paying only for the benefit achieved.

Other objects, aspects and advantages of the present invention can be obtained from a study of the specification, the drawings, and the appended claims.

DETAILED DESCRIPTION OF THE INVENTION

The present invention combines a yield monitoring system with GPS technology, or other geo-referencing technology, to produce visual overlays or maps which illustrate to a farmer or grower the amount of yield increase that has resulted from use of a particular yield-increase and/or crop protection product. Based on a contract that was entered into with the farmer/grower before application of the yield-increase and/or crop protection product, the farmer/grower will pay for the product generally according to the amount of yield increase that was achieved. The difference in, or the amount of, the yield increase is determined by applying the product to select areas of the field(s) and leaving other areas untreated. Calculation of the yield increase is done by comparing the harvested yield of the treated areas with that of the untreated areas.

Typically, a problem with various yield-increase and/or crop protection products in agriculture today is that they produce no visual differences in the field, even though a yield increase is achieved when the crop is harvested. In general, a farmer will apply a yield-increase and/or crop protection product and the only way of knowing whether or not it produced a desired result is by measuring the treated areas and the untreated areas differently, and separately weighing out the harvested crop (grain, fiber, etc.) from the treated and untreated areas. While the farmer may have good intentions of separately measuring/weighing the treated and untreated areas, it may happen that due to weather or other conditions the farmer is interested only in harvesting the crop as quickly as he can, and cannot spare the time it takes to separately measure and weigh and the treated and untreated areas to determine whether the treated areas showed a yield increase. The present invention overcomes these problems and results in a new way of marketing and contracting for the sale of yield-increase and/or crop protection related products.

When the contract is first entered into with the farmer for the sale of a yield-increase and/or crop protection related product, it is decided that certain areas of the farmer's field will be treated with the product and certain areas will be left untreated. These areas may be in the form of a series of treated and untreated strips on a continuing pattern throughout the field, or may be in any form convenient for the application of the product. Application of the treated area may be made by airplane or a ground applicator that utilizes GPS technology, or other geo-referencing technology, to create a map that shows exactly where the product was applied and at the same time shows exactly where the product was not applied. Geo-referenced treated areas might also be established via application of the product by means of drip, furrow, or overhead irrigation. These represent the treated and untreated areas, respectively. The geo-referenced application data which differentiates between the treated and untreated areas is typically stored electronically in a computer readable database.

The farmer will utilize geo-referenced yield-monitoring equipment during harvesting for the purpose of measuring and recording the amount and location of the commodity being harvested from both the treated and untreated areas. This data will also be stored electronically in a computer readable database. Combining the geo-referencing and yield monitoring equipment on the harvest machinery allows real time determination and mapping of yield data as the harvest machinery passes through the field. The yield monitor may include a flow meter, a weight monitor, or other crop measuring device that records the quantity of the harvested commodity.

The geo-referencing equipment on the harvest machinery, as well as on the initial chemical (product) application apparatus (whether air or ground) may include transmitter(s)/receiver(s) which transmits and receives signals to/from an array of earth orbiting satellites and/or ground-based stations from which coordinates on the surface of the earth can be determined, along with direction of movement, elevation and/or ground speed of the geo-reference equipped apparatus. If earth orbiting satellites are used as typically implemented in GPS technology, signals from an earth-based antenna at a precisely known location may also be received by the GPS receiver(s) to enhance the accuracy of the calculated location from coordinate data received from the earth orbiting satellites. Such GPS-driven application processes, as well as GPS-driven yield monitoring processes for comparing the yields of treated and untreated areas, are generally known in the art, and one of ordinary skill practicing the present invention will readily understand how to implement such processes.

In one example, the farmer, with the harvest machinery including the geo-referencing equipment (e.g., GPS technology) and yield monitor, essentially harvests the crop as he typically would, with little regard as to whether the section being harvested is treated or untreated. The geo-referencing technology handles monitoring the location of the harvesting equipment. The yield data and coordinate data are combined along with the previously stored treatment and coordinate data, and an electronic data map is produced which records the yield produced by the treated and untreated areas, thus quantifying any difference(s) in yield within and between the treated and untreated areas. However, it has been found that uncorrected raw data from GPS-equipped yield monitors may be less than 50% accurate.

To improve this accuracy, it is contemplated herein to utilize techniques on the raw data, such as, for example, spatial statistical regression analysis techniques, to improve the accuracy of the raw data. Performing, for example, spatial statistical regression analysis on the raw yield data calculations will correct and correlate field data and provide a higher degree of accuracy than is possible without such analysis.

To aid in performing correction and correlation of the field data, the electronic application data from the applicator's GPS data mapping device is transferred via the Internet or other means to an electronic mailbox, website, or computer designed and configured for the receipt and/or storage and/or manipulation of such data. Similarly, the electronic application data from the farmer's GPS yield monitor/mapping device is transferred via the Internet or other means to an electronic mailbox, website, or computer designed and configured for the receipt and/or storage and/or manipulation of such data.

In one form, payment for the yield-increase and/or crop protection product is determined by the amount of yield increase that has been achieved. For example, in a contract that has been entered into prior to any treatment, the farmer will have agreed to pay certain amounts depending upon the amount of yield increase that has been achieved. These payments amounts may increase as the yield increase goes up, and may also be capped off at a maximum amount. In another form, if a yield increase is not achieved, the farmer does not pay anything, or pays less than full price, for the yield-increase and/or crop protection, and/or for the expense associated with having applied the yield-increase and/or crop protection product. The specifics of the resulting payment may be stored electronically in a computer readable database.

In a further form, a processor in a computer may automatically calculate the yield increase from the stored yield/coordinate data and treatment/coordinate data, and may automatically bill the farmer for the yield-increase and/or crop protection related product based on the contract terms previously agreed to, which will have also been stored in the computer memory. This helps the billing and payment process be more streamlined, and with the farmer seeing the yield increase he is receiving via the generated maps, he will feel more satisfied paying for the product knowing it has produced beneficial results.

Marketing and contracting for the sale of agricultural yield-increase and/or crop protection related products in this manner puts the farmer at ease as he does not have to pay for the product unless a quantifiable yield increase has been achieved. While the yield-increase and/or crop protection product may not produce any discernable visual differences in the field, harvesting the crop using the geo-referenced technology system combined with the yield monitor will allow maps to be produced in which the farmer can easily see any yield increase that has been achieved. This pay-by-performance method of marketing and contracting for the sale of such products should increase the farmer's interest in the product since the seller of the product is at risk should his product not produce as advertised.

After the initial application is done and yield increases are illustrated via the treated and untreated areas, the farmer may contract with the seller to treat the entire field at an agreed upon price. If that price is to be in accordance with certain yields produced in the field as a whole, the yield monitor (with or without the geo-referencing technology) may be used to automatically calculate the amount of yield and store that calculation in a computer database for automatic billing based on the agreed upon price structure.

As an additional inventive feature, the collection and analysis of field performance data following product application can be utilized in generating databases and dossiers for a number of uses. For example, the collection and analysis of field performance data can be used to build a product efficiency database for the development of products claims, marketing materials, testimonials, etc. that can be used to prove product performance. The system has the capability to provide huge amounts of data to support sales and marketing to prove to a grower that the product works and that he pays only for performance. The data can be mined for multiple purposes such as, but not limited to, the integration of maps of soil texture, fertility, nematodes, etc. Once basic items such as rate(s), timing(s), crop safety, etc. have been established and replicated in small plot trials, demonstration trials can then be undertaken.

The present invention can offer a commercial product-proving tool to anyone interesting in using it. Multiple hybrids or varieties can be planted across a field (or different levels of fertility, irrigation seed rating, etc.) and a test treatment can be applied across parts of the field at, for example, 90-degree angles. This will allow one to test for product drift by looking at yield patterns and possibly aerial imagery of plant color, etc.

Strip trials can also be used in treating numerous acres (greater than 10 acres), the results from which can be invaluable to tech service and sales reps. Another area is use in pest management activities, such as surveying and mapping pests (insect or weed) in a field and then documenting product performance, crop safety, etc.

As another example, the collection and analysis of field performance data can be used to build a performance dossier for submission to governing bodies, such as the EPA, for registration purposes. As regulations currently stand, treating numerous acres in demos or strip trials is not permitted until either an Experimental Use Permit ("EUP") or a full label is secured from the EPA. Thus, once an EUP is in place, commercial scale data collected in accordance with the present invention can supplement small plot data for registration purposes.

It should be noted that the present invention has frequently been described as utilizing GPS technology, as that is the prevalent geo-referencing system commonly utilized. One skilled in the art will readily recognize that any geo-referencing system which may be developed using a variety of technologies may be implemented into the present invention with departing from the spirit and scope thereof. The present invention is therefore not limited to utilization of a satellite-dependent geo-referencing system.

The present invention offers the following advantages:

Allows a geo-referenced equipped farmer to take demo to-yield without slowing down the harvest process.
Eliminates the need to harvest varieties/hybrids separately.
Eliminates the need for mechanical weigh wagons or scales (except for yield monitor calibration).
Eliminates the need for on-site personnel during harvest.
Increases the number of yield trials each sales rep can manage.
Compensates for field variability (soil type, elevation, etc.) while delivering statistically significant data from on-farm field demos of any size.
Enables every demo to produce highly-credible yield results.
Increases farmer acceptance of all on-farm demo data.
The opportunity to conduct more field demos without increased staff or capital expense.
The ability to accurately discern small, but meaningful, differences in yields that might otherwise be lost due to unaccounted for field variability.
The potential for every split field and strip trial to contribute meaningful data to the overall performance data set.
Improved consistency between field and small-block, replicated trial results.
Increased credibility with the farmer/grower.

While the present invention has been described herein with reference to a particular embodiment(s), it should be understood that various modifications could be made without departing from the spirit and scope of the present invention. Those skilled in the art will appreciate that various other modifications and alterations could be developed in light of the overall teachings of the disclosure. The presently preferred embodiment(s) described herein are meant to be illustrative only and not limiting as to the scope of the invention which is to be given the full breadth of the appended claims and any and all equivalents thereof.

The following set of claims is not limiting, but is merely exemplary of the preferred aspects of the present invention. It is to be understood that the present patent application instead covers all aspects of the present invention as shown and described herein.

We claim:

1. A method comprising:
   (A) entering into a contract with a party for the sale of an agricultural product;
   (B) storing terms of the contract in a computer memory;
   (C) mapping areas of a field which have been treated with the agricultural product and areas of the field which have not been treated with the agricultural product to produce a treatment map;
   (D) storing the treatment map in a computer-readable database;
   (E) measuring an amount of crop harvested from the field in both the treated areas and the untreated areas to produce yield data;
   (F) storing the yield data in a computer readable database;
   (G) using a computer processor to compare the amount of crop harvested in the treated areas with the amount of crop harvested in the untreated areas;
   (H) if the comparison indicates a yield increase associated with the treated areas then, after (G), charging the party for the agricultural product in an amount based on the yield increase associated with the treated areas; and
   (I) if the comparison does not indicate a yield increase associated with the treated areas, then not charging the party in any amount for the agricultural product, whereby the party does not make any payment for the agricultural product unless the comparison indicates a yield increase associated with the treated areas.

2. The method of claim 1, wherein the agricultural product comprises a yield increase product.

3. The method of claim 1, wherein the agricultural product comprises a crop protection product.

4. The method of claim 1, wherein (C) comprises using geo-referencing technology on planting equipment to map the areas of a field which have been treated with the agricultural product and areas of the field which have not been treated with the agricultural product.

5. The method of claim 4, wherein the geo-referencing technology comprises Global Positioning System (GPS) technology.

6. The method of claim 1, wherein (E) comprises using geo-referencing technology on harvesting machinery to measure the amount of crop harvested from the field in both the treated areas and the untreated areas.

7. The method of claim 6, wherein the geo-referencing technology comprises Global Positioning System (GPS) technology.

8. The method of claim 1, further comprising:
(J) producing a map which illustrates the amount of yield increase that has resulted from the use of the agricultural product.

9. The method of claim 1, wherein (H) comprises charging the party for an amount based on terms of the contract which specify a relationship between yield increase and the amount to be charged to the party.

10. The method of claim 1, wherein (H) comprises charging the party an amount which increases as the amount of yield increase associated with the treated areas increases.

11. The method of claim 1, wherein (H) comprises charging the party an amount which increases as the amount of yield increase associated with the treated areas increases, with the amount charged to the party being capped at a maximum amount.

12. The method of claim 1, further comprising:
(J) storing a record of the amount charged in a computer readable database.

13. The method of claim 1, further comprising:
(J) before (C), applying the agricultural product to the treated areas and leaving the untreated areas untreated.

14. The method of claim 13, wherein (J) comprises:
(J)(1) applying the agricultural product to the treated area using an applicator that utilizes geo-referencing technology to create an application map which specifies where the agricultural product has been applied and where the agricultural product has not been applied; and
(J)(2) storing the application map in a computer readable database.

15. The method of claim 14, wherein (E) comprises:
(E)(1) utilizing geo-referenced yield-monitoring equipment during harvesting of crop from the field in both the treated areas and the untreated areas to obtain a yield map, the yield map including the amount and location of the crop being harvested from both the treated and the untreated areas; and
(E)(2) storing the yield map in a computer readable database.

16. The method of claim 15, wherein the yield-monitoring equipment comprises a flow meter.

17. The method of claim 15, wherein the yield-monitoring equipment comprises a weight monitor.

18. The method of claim 15, wherein (G) comprises combining the application map and the yield map to produce an electronic data map representing the yield produced by the treated and untreated areas.

19. The method of claim 18, wherein producing the electronic data map includes performing spatial regression analysis on the yield map to correct and correlate data in the yield map.

20. The method of claim 15, wherein the yield-monitoring equipment includes Global Positioning System (GPS) technology, and wherein (E) (1) comprises using the GPS technology of the yield-monitoring equipment to identify the location of the crop being harvested from both the treated and the untreated areas.

21. A system for use in connection with a contract between a first party and a second party for the sale of an agricultural product from the first party to the second party, the system comprising:
means for storing terms of the contract in a computer memory;
mapping means for mapping areas of a field which have been treated with the agricultural product and areas of the field which have not been treated with the agricultural product to produce a treatment map;
means for storing the treatment map in a computer-readable database;
measurement means for measuring an amount of crop harvested from the field in both the treated areas and the untreated areas to produce yield data;
means for storing the yield data in a computer readable database;
comparison means for comparing the amount of crop harvested in the treated areas with the amount of crop harvested in the untreated areas charging means for charging the party, only if the comparison indicates a yield increase associated with the treated areas and after using the computer processor to compare the amount of crop harvested in the treated areas with the amount of crop harvested in the untreated areas, determining in an amount based on the yield increase associated with the treated areas, whereby the party does not make any payment for the agricultural product unless the comparison indicates a yield increase associated with the treated areas.

22. The system of claim 21, wherein the agricultural product comprises a yield increase product.

23. The system of claim 21, wherein the agricultural product comprises a crop protection product.

24. The system of claim 21, wherein the mapping means comprises means for mapping the areas of a field which have been treated with an agricultural product and areas of the field which have not been treated with the agricultural product.

25. The system of claim 24, wherein the geo-referencing technology comprises Global Positioning System (GPS) technology.

26. The system of claim 21, wherein the measurement means comprises means for measuring the amount of crop harvested from the field in both the treated areas and the untreated areas.

27. The system of claim 26, wherein the geo-referencing technology comprises Global Positioning System (GPS) technology.

28. The system of claim 21, further comprising:
map production means for producing a map which illustrates the amount of yield increase that has resulted from the use of the agricultural product.

29. The system of claim 21, wherein the charging means comprises means for determining an amount to charge the second party based on terms of the contract which specify a relationship between yield increase and the amount to be charged to the second party.

30. The system of claim 21, wherein the charging means comprises means for determining an amount which increases as the amount of yield increase associated with the treated areas increases.

31. The system of claim 21, wherein the charging means comprises means for determining an amount which increases as the amount of yield increase associated with the treated areas increases, with the amount charged to the second party being capped at a maximum amount.

32. The system of claim 21, further comprising:
means for storing a record of the amount charged.

33. The system of claim 21, further comprising:
product application means for applying the agricultural product to the treated areas and for leaving the untreated areas untreated.

34. The system of claim 33, wherein the product application means comprises:
means for applying the agricultural product to the treated area using an applicator that utilizes geo-referencing technology to create an application map which specifies where the agricultural product has been applied and where the agricultural product has not been applied; and
means for storing the application map in a computer readable database.

35. The system of claim 34, wherein the measurement means comprises:
means for utilizing geo-referenced yield-monitoring equipment during harvesting of crop from the field in both the treated areas and the untreated areas to obtain a yield map, the yield map including the amount and location of the crop being harvested from both the treated and the untreated areas; and
means for storing the yield map in a computer readable database.

36. The system of claim 35, wherein the yield-monitoring equipment comprises a flow meter.

37. The system of claim 35, wherein the yield-monitoring equipment comprises a weight monitor.

38. The system of claim 35, wherein the comparison means comprises means for combining the application map and the yield map to produce an electronic data map representing the yield produced by the treated and untreated areas.

39. The system of claim 35, wherein the comparison means comprises means for performing spatial regression analysis on the yield map to correct and correlate data in the yield map.

40. The system of claim 35, wherein the yield-monitoring equipment includes Global Positioning System (GPS) technology, and wherein the means for utilizing geo-referenced yield-monitoring equipment comprises means for using the GPS technology of the yield-monitoring equipment to identify the location of the crop being harvested from both the treated and the untreated areas.

* * * * *

UNITED STATES PATENT AND TRADEMARK OFFICE
CERTIFICATE OF CORRECTION

Page 1 of 1

PATENT NO. : 8,195,541 B2
APPLICATION NO. : 12/608659
DATED : June 5, 2012
INVENTOR(S) : Richard L. Rice et al.

It is certified that error appears in the above-identified patent and that said Letters Patent is hereby corrected as shown below:

In column 8, line 23, in Claim 21, delete "areas" and insert -- areas; --, therefor.

In column 8, lines 23-33, in Claim 21, delete "charging means .............. treated areas." and insert the same on line 24 as a separate paragraph.

In column 8, line 28, in Claim 21, delete "areas, determining" and insert -- areas, --, therefor.

In column 10, line 13, in Claim 39, delete "35," and insert -- 38, --, therefor.

Signed and Sealed this
Eleventh Day of September, 2012

David J. Kappos
*Director of the United States Patent and Trademark Office*